United States Patent [19]

Sugasawa et al.

[11] Patent Number: 4,733,883

[45] Date of Patent: Mar. 29, 1988

[54] SUSPENSION CONTROL SYSTEM FOR AUTOMOTIVE VEHICLE WITH ANTI-DIVE CONTROL DURING DECELERATION

[75] Inventors: Fukashi Sugasawa; Junsuke Kuroki; Yohsuke Akatsu, all of Yokohama, Japan

[73] Assignee: Nissan Motor Company, Limited, Kanagawa, Japan

[21] Appl. No.: 744,380

[22] Filed: Jun. 13, 1985

[30] Foreign Application Priority Data

Jun. 14, 1984 [JP] Japan ................. 59-122827

[51] Int. Cl.$^4$ .............................. B60G 17/08
[52] U.S. Cl. ................................. 280/707
[58] Field of Search ............ 280/707, 703, DIG. 1, 280/714; 188/299

[56] References Cited

U.S. PATENT DOCUMENTS

| | | | |
|---|---|---|---|
| 3,603,612 | 9/1971 | Hill | 280/707 |
| 3,992,039 | 11/1976 | Hiruma | 280/703 |
| 4,506,909 | 3/1985 | Nakashima | 280/707 |
| 4,586,728 | 5/1986 | Tokunaga et al. | 280/707 |

FOREIGN PATENT DOCUMENTS

| | | |
|---|---|---|
| 56-111009 | 8/1981 | Japan . |
| 58-30819 | 2/1983 | Japan . |
| 2006131 | 5/1979 | United Kingdom ........ 280/689 |

*Primary Examiner*—John J. Love
*Assistant Examiner*—Karin L. Ferriter
*Attorney, Agent, or Firm*—Schwartz, Jeffery, Schwaab, Mack, Blumenthal & Evans

[57] ABSTRACT

A suspension control system can precisely control the damping characteristics of vehicular suspension for successfully and satisfactorily providing anti-dive and anti-rebound feature. The suspension control system is adapted to detect vehicle deceleration on the basis of a variation of a vehicle speed and to compare the vehicle speed with a predetermined vehicle speed criteria across which damping characteristics of the vehicular suspension vary between a harder suspension mode and a softer suspension mode. The vehicle speed criteria is variable depending upon vehicle deceleration so that the criteria becomes higher when the magnitude of deceleration is greater than a predetermined level. By hardening the suspension at an earlier timing during relatively abrupt deceleration of the vehicle, the magnitude of nose dive is reduced and the magnitude of rebounding motion after nose-dive can be reduced. This assures riding comfort by reducing the magnitude of pitching behavior of the vehicle front end. On the other hand, by providing later timing for hardening the suspension while deceleration of the vehicle is relatively low, softer damping characteristics can be maintained for a longer period to assure riding comfort by successfully absorbing bounding and rebounding shock from the road surface.

20 Claims, 16 Drawing Figures

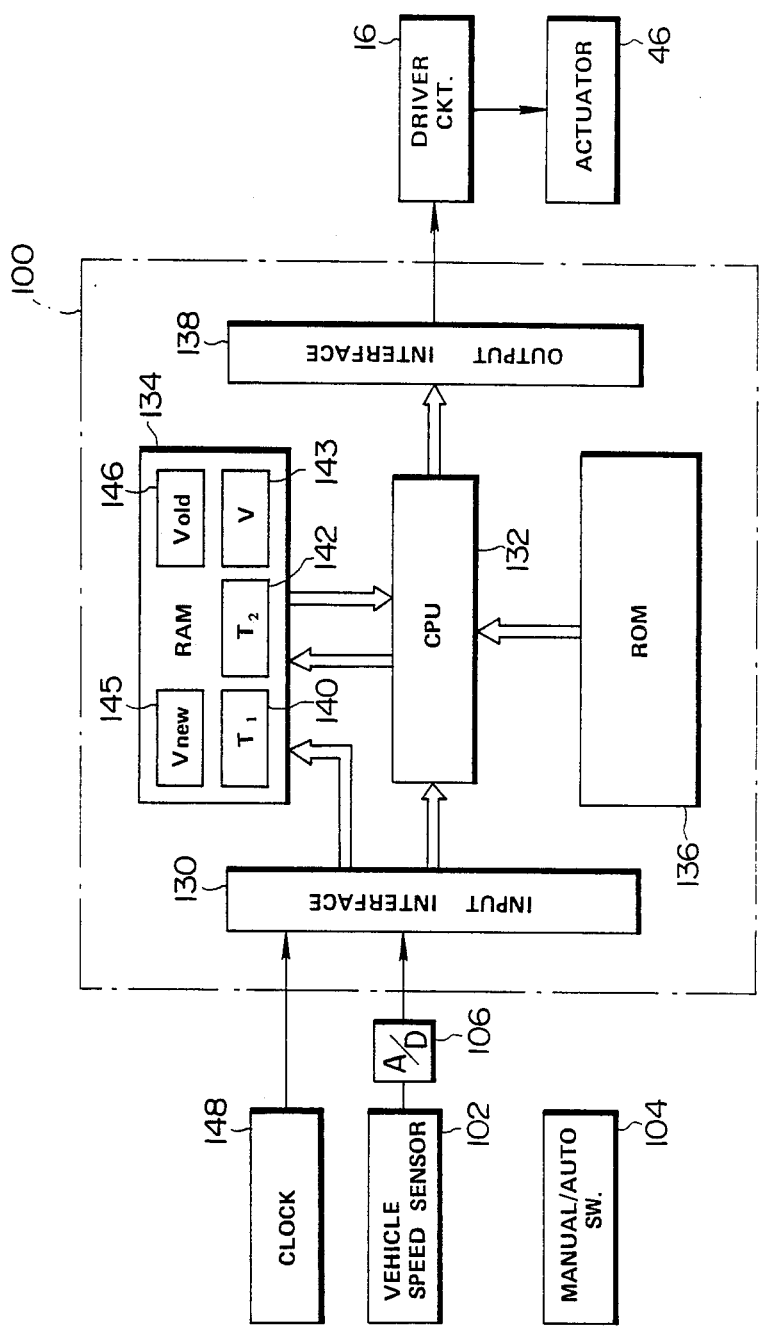

SUSPENSION CONTROL SYSTEM FOR AUTOMOTIVE VEHICLE WITH ANTI-DIVE CONTROL DURING DECELERATION

BACKGROUND OF THE INVENTION

The present invention relates generally to a suspension control system for an automotive vehicle for controlling damping characteristics or stiffness of a vehicular suspension system depending upon vehicle driving condition. In particular, the invention relates to an automotive suspension control system which performs anti-dive control for suppressiving nose-dive and rebounding after nose-dive, during decelation of the vehicle to a stop.

Published Japanese Utility Model Application No. (Jikkai) Sho. 56-111009, discloses a suspension system having a variable shock absorber with adjustable shock-absorbing characteristics. The shock absorber is associated with a controller for controlling the damping foce thereof. The controller operates the shock absorber to produce a higher damping force when it detects deceleration of the vehicle. The higher damping force is maintained as long as the vehicle brakes are applied to decelerate the vehicle. In other words, as soon as the brakes are released, the damping force to be produced by the shock absorber is reduced.

When applying brakes in order to stop the vehicle, the center of gravity shifts forward due to the inertia of the vehicle, which causes the vehicle "to nose dive". By adjusting the damping force to be produced by the shock absorber to HIGH, the magnitude of the nose dive can be limitted. On the other hand, at the end of vehicle deceleration, the center of gravity moves rearward, causing the front end of the vehicle to rebound. In particular, when the brake is released immediately after stopping of the vehicle, the controller operates the shock absorber to lower the damping force. This may enhance the rebounding behavior of the vehicle and degrade riding comfort.

Another approach has been discussed in the Published Japanese Patent Application (Tokkai) Showa 58-30816, in which abrupt deceleration of the vehicle is detected by means of a pressure sensor disposed within a hydraulic brake circuit. When abrupt deceleration of the vehicle is detected from the pressure sensor signal value, suspension system is hardened in order to suppress nose-dive. Such the suspension control may be successful in preventing nose-dive of the vehicle. However, since the magnitude of nose-dive is variable depending upon the deceleration of the vehicle, and rebounding magnitude after nose-dive is variable depending upon the magnitude of the nose-dive, the aforementioned suspension control system is not yet satisfactory in a sense of precise control for the suspension for precisely adopting stiffness or damping characteristics to the vehicle driving condition.

SUMMARY OF THE INVENTION

Therefore, it is a principle object of the invention to provide a suspension control system which can precisely control the damping characteristics of a vehicular suspension for successfully and satisfactorily providing anti-dive and anti-rebound features.

Another and more specific object of the invention is to provide a suspension control system which has a variable timing for hardening the suspension system depending upon vehicular deceleration.

In order to accomplish the above-mentioned and other objects, a suspension control system, according to the present invention, is adapted to detect vehicle deceleration on the basis of a variation of a vehicle speed and to compare the vehicle speed with a predetermined vehicle speed criteria across which damping characteristics of the vehicular suspension varies between a harder suspension mode and a softer suspension mode. The vehicle speed criteria is variable depending upon vehicle deceleration so that the criteria becomes higher when the magnitude of deceleration is greater than a predetermined level.

By hardening the suspension at an earlier timing during relatively abrupt deceleration of the vehicle, the magnitude of nose dive is reduced and the magnitude of rebounding motion after nose-dive can be reduced. This assures riding comfort by reducing the magnitude of pitching behavior of the vehicle front end. On the other hand, by providing later timing for hardening the suspension while deceleration of the vehicle is relatively low, softer damping characteristics can be maintained for a longer period to assure riding comfort by successfully absorbing bounding and rebounding shock from the road surface.

According to one aspect of the invention, a suspension control system for an automotive vehicle comprises a vehicular suspension system having variable damping characteristics at least between first harder suspension mode and second softer suspension mode, a vehicle speed sensor producing a vehicle speed signal representative of vehicle speed, and a controller detecting vehicle speed drop across a predetermined value which is representative of substantially low vehicle speed to produce a control signal for operating the suspension system to the first mode, the controller varying the predetermined value between a first greater value and a second smaller value, the controller detecting vehicle deceleration to use the first greater value when the vehicle deceleration is greater than a given value and, otherwise to use the second value.

According to another aspect of the invention, a suspension control system for an automotive vehicle comprises a suspension system having variable damping characteristics at least between a first harder suspension mode and a second softer suspension mode, a vehicle speed sensor producing a vehicle speed signal having a value representative of the vehicle speed, a controller comparing the vehicle speed signal value with a predetermined threshold value which is representative of substantially low vehicle speed to operate the suspension system into the first mode when the vehicle speed signal value varies across the threshold value, the controller detecting the vehicle speed value decreasing across a predetermined reference value which is greater than the threshold value, to the threshold value to a first greater value and holding the threshold value at the first value for a given period and switching the threshold value to a second smaller value after the given period expires.

According to a further aspect of the invention, in an automotive suspension system which has variable damping characteristics at least between a first harder suspension mode and a second softer suspension mode, a method for anti-dive controlling the suspension comprising the steps of:
  monitoring vehicle speed;

deriving a vehicle deceleration rate on the basis of the vehicle speed variation;

setting a first higher threshold value to be compared with the vehicle speed when the vehicle deceleration is higher than a given value;

setting a second lower threshold value to be compared with the vehicle speed when the vehicle deceleration is lower than the given value;

comparing the vehicle speed with a set threshold value to operate the suspension system to the first mode when the vehicle speed is lower than the threshold value.

According to a still further aspect of the invention, in an automotive suspension system having variable damping characteristics at least between a first harder suspension mode and a second softer suspension mode, a method for controlling the suspension comprises monitoring a vehicle speed to produce a vehicle speed signal having a value representative of the vehicle speed, detecting the vehicle speed indicative signal value decreasing across a first reference value to set a second reference value, comparing the vehicle speed indicative signal value with the second reference value to operate the suspension into the first mode when the vehicle speed indicative signal value decreases below the second reference value with a given period of time from setting the second reference value, detecting expiration of the given period of time during which the vehicle speed indicative signal value is maintained higher than the second reference value to set a third reference value which is lower than the second reference value and representative of substantially low speed of the vehicle, and comparing the vehicle speed indicative signal value with the third reference value to operate the suspension system into the first mode when the vehicle speed indicative signal value decreases across the third reference value.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment or embodiments, but are for explanation and understanding only.

In the drawings:

FIG. 2 is a block diagram of the first embodiment of a suspension control system according to the present invention;

DESCRIPTION OF THE PREFERRED EMBODIMENT

Figure 1:
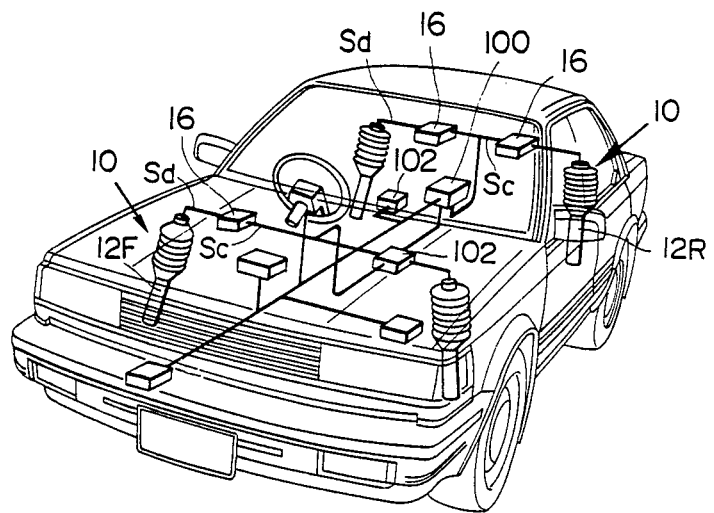
FIG. 1 is a perspective illustation of a vehicle with a diagram in perspective of essential elements of a vehicle suspension system with a variable damper to which the preferred embodiments of a shock absorbing-characteristics control system are applied.

Referring now to the drawings, particularly to FIG. 1, the first embodiment of a suspension control system, according to the invention, has front and rear suspensions including front and rear suspension struts 12F and 12R. In each of the front and rear suspension struts 12F and 12R, a variable shock absorber 14 which has variable damping characteristics at least between HARD mode and SOFT mode, is provided. In the HARD mode, the shock absorber 14 produces higher shock absorbing or damping force to increase stiffness of the suspension. On the other hand, in SOFT mode, the shock absorber 14 produced lower shock absorbing force to provide smaller stiffness for the suspension.

The shock absorber 14 is connected to a driver circuit 16 which is, in turn, connected to a controller 100. The controller is adapted to derive the mode of the shock absorber on the basis of one or more preselected suspension control parameters. The driver circuit 16 is responsive to a suspension control signal produced by the controller 100 to operate the shock absorber 14 to the one of the HARD AND SOFT modes derived by the controller. In accordance with the shown embodiment, the controller 100 is connected to a vehicle speed sensor 102 to receive therefrom a vehicle speed indicative signal $S_v$ which has a value V representative of the vehicle speed. In practice, the controller may be connected to other sensors, such as a road sensor for monitoring smoothness of the road surface for performing road condition-dependent suspension control, a steering angle sensor for monitoring steering behavior for performing roll-suppressive suspension control and so forth. The controller 100 may also be adapted to perform a vehicle speed dependent control for varying damping characteristics depending upon the vehicle speed.

In the preferred embodiment, the controller 100 is adapted to control damping characteristics of the suspension for preventing the vehicle from causing nose-dive and rebounding motion after nose-dive. Throughout the disclosure, the control for preventing the vehicle from causing nose-dive and rebounding motion thereafter will be referred to as "anti-dive control". Also, in the disclosure, the word "rebound" or "rebounding motion" means vehicle rebounding motion caused after nose-dive. The "nose-dive" means vehicular pitching motion to cause lowing the front end of the vehicle during deceleration of the vehicle.

For performing anti-dive suspension control, the controller 100, in the shown embodiment, receives the vehicle speed for determining a demand for a harder suspension. For instance, when the vehicle speed is decelerated below a predetermined speed, the controller 100 recognizes that the vehicle is substantially stopping. Such condition satisfies the harder suspension condition for anti-dive control. Therefore, the controller 100 issues a control signal ordering HARD mode for the shock absorber 14.

The controller 100 further detects vehicle deceleration. The controller 100 switches the aforementioned predetermined speed to be compared with the vehicle speed to a higher value when the vehicle deceleration is higher than a given value.

Figure 3:
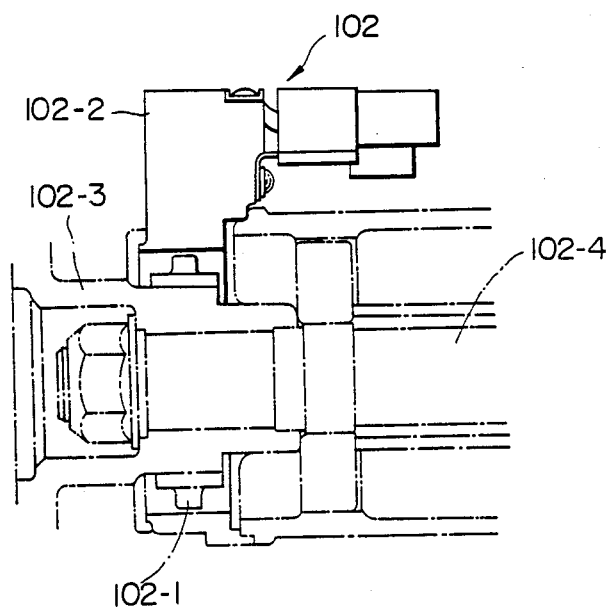
FIG. 3 is an illustration of an example of a vehicle speed sensor applicable to the preferred embodiment of the suspension control system of FIG. 2.
Figure 4:
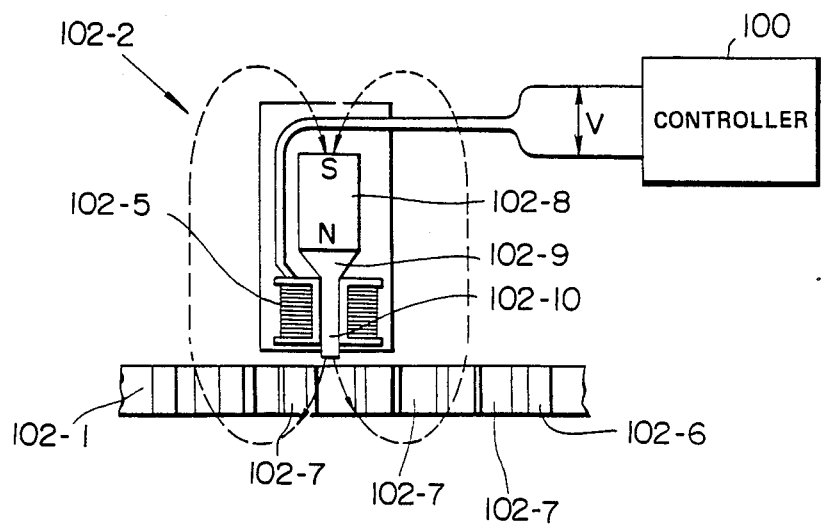
FIG. 4 is anenlarged view of the major part of the vehicle speed sensor.

FIGS. 3 and 4 illustrate an example of the vehicle speed sensor 102 for detecting vehicle speed V.

FIG. 3 shows the structure of the vehicle speed sensor 102. The vehicle speed sensor 102 comprises a sensor rotor 102-1 and a sensor assembly 102-2. The sensor rotor 102-1 is associated with a companion flange 102-3 which is, in turn, rigidly secured to a drive shaft 102-4 for rotation therewith. Thus, the sensor rotor 102-1 rotates with the drive shaft 102-4. The sensor assembly 102-2 is fixed to a final drive housing or a differential gear box (not shown).

The sensor assembly 102-2 is adapted to output an alternating-current signal having a frequency proportional to or corresponding to the rotational speed of the corresponding vehicle wheel. The electromagnetic coil 102-5 of the sensor assembly 102-2 is connected to the controller 100 to supply the sensor signals thereto.

As shown in FIG. 4, the sensor rotor 102-1 is formed with a plurality of sensor teeth 102-6 at regular angular intervals. The width of the teeth 102-6 and the grooves 102-7 therebetween are equal in the shown embodiment and define a unit angle of wheel rotation. The sensor assembly 102-2 comprises a magnetic core 102-8 aligned with its north pole (N) near the sensor rotor 102-1 and its south pole (S) distal from the sensor rotor. A metal element 102-9 with a smaller diameter section 102-10 is attached to the end of the magnetic core 102-8 nearer the sensor rotor. The free end of the metal element 102-9 faces the sensor teeth 102-6. An electromagnetic coil 102-5 encircles the smaller diameter section 102-10 of the metal element. The electromagnetic coil 102-5 is adapted to detect variations in the magnetic field generated by the magnetic core 102-8 to produce an alternating-current sensor signal. That is, the metal element 102-9 and the magnetic core 102-8 form a kind of proximity switch which adjusts the magnitude of the magnetic field depending upon the distance between the free end of the metal element 102-9 and the sensor rotor surface. Thus, the intensity of the magnetic field fluctuates in relation to the passage of the sensor teeth 102-6 and accordingly in relation to the angular velocity of the wheel.

Figure 5:
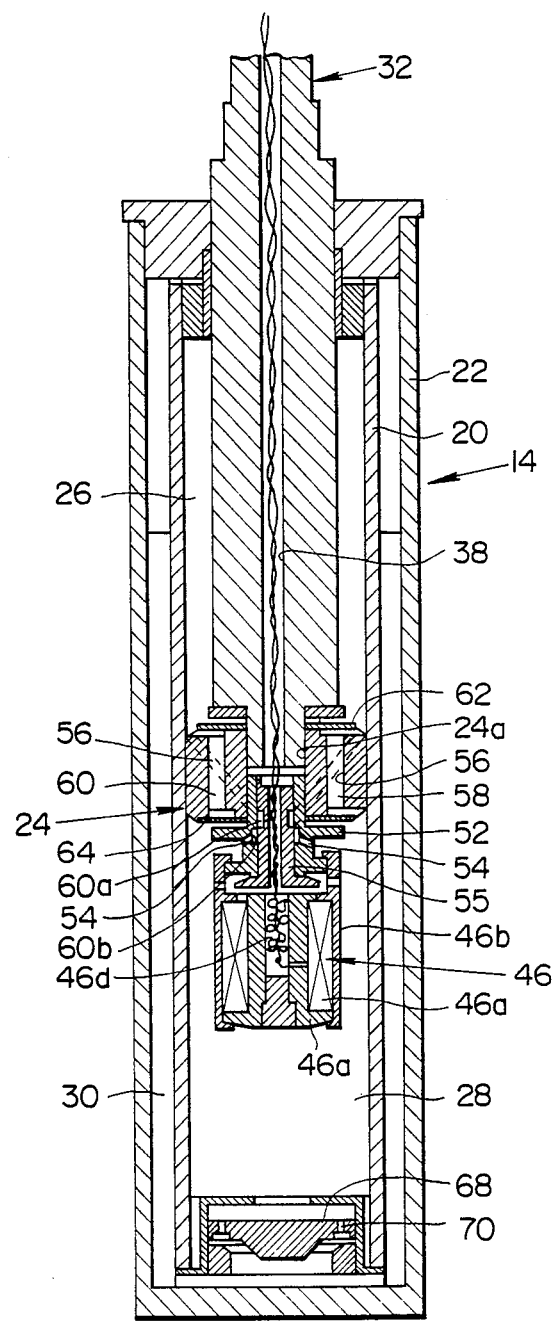
FIG. 5 is a cross-section of a shock absorber serving as the variable damper employed in the preferred embodiment of the suspension system.

In order to allow adjustment of the shock absorbing characteristics, the shock absorber 14 employed in the preferred embodiment, generally comprises an inner and an outer hollow cylinders 20 and 22 arranged coaxially, and a piston 24 fitting flush within the hollow space in the inner cylinder 20, as shown in FIG. 5. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 is formed with an axially extending through opening 38.

The piston 24 defines flow-restrictive fluid passages 58 and 60. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased towards the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The piston 24 has a central through opening 24a. Upper end of the opening 24a is adapted to engage with the lower end of the piston rod 32. The lower end of the opening 24a is adapted to receive the upper end of a sleeve 52. The sleeve 52 has an axially extending bore to thrustingly receive a flow control valve spool 55 and a plurality of radially extending orifices 54. The sleeve 52 is further formed with an annular groove 60b extending along the inner periphery thereof. The radially extending orifices 54 expose their inner ends to the annular groove 60b. The outer ends of the orifices 54 open toward the lower fluid chamber 28.

The valve spool 55 is formed with annular groove 60a the outer periphery thereof. The annular groove 60a is in communication with the upper fluid chamber 26 through a fluid passage 56 defined through the piston body and the sleeve. The annular groove 60a is located at a vertical position at which it mates with the annular groove 60b of the sleeve 52 at the lower position of the spool and is shifted away from the annular groove 60b at the upper position of the spool.

The spool 55 is normally biased upwardly by means of a bias spring 46d of an actuator 46 which comprises an electromagnetic coil 46a housed in an enclosed casing 46b and a yoke 46c. The casing 46b engages with the sleeve 52 at the upper end thereof so that the actuator 46 can be firmly mounted on the piston 24. When the electromagnetic coil 46a is energized, it pulls the spool 55 downwardly to place the spool at its lower position.

When the spool is in the lower position, fluid communication is established between the upper and lower fluid chambers 26 and 28 through the fluid passage 56, the grooves 60a and 60b and orifices 54. Therefore, total flow path area for allowing fluid communication between the upper and lower chambers 26 and 28 becomes bigger. As a result, flow restriction becomes smaller to soften damping characteristics of the vehicle. On the other hand, when the spool is in the upper position as shown in FIG. 5, fluid communication between the upper and lower fluid chambers 26 and 28 through the fluid passage 56 is blocked. Therefore, at this position, fluid communication between the upper and lower fluid chambers 26 and 28 is established only by one of the fluid passages 56 and 58. Thus the fluid flow area become smaller to provide higher flow restriction.

Therefore, the damping characteristics of the shock absorber 14 become harder.

As will be appreciated herefrom, when the controller 100 orders the SOFT mode, the actuator 46 is energized to lower the spool to establish fluid communication between the upper and lower fluid chambers 26 and 28 through the fluid passage 56. On the other hand, when the controller 100 orders the HARD mode, the actuator 46 is deenergized to move the spool 55 to its upper position by means of the bias spring 46d. Thus, fluid communication between the upper and lower fluid chambers 26 and 28 via the fluid passage 56 is blocked.

Returning to FIG. 2, the controller 100 is also connected to a manually operable switch 104 which allows manual selection of control mode. The switch 104 may be operable between MANUAL HARD mode, MANUAL SOFT mode and AUTO mode. In MANUAL HARD mode, the controller 100 constantly orders HARD mode of the shock absorber 14. In MANUAL SOFT mode, the controller 100 controls the shock absorber 14 to maintain the latter in the SOFT mode. In the AUTO mode, the controller performs automatic suspension control including anti-dive control on the basis of preselected suspension control parameters.

The process of anti-drive suspension control to be performed by the first embodiment of suspension control system will be described with reference to FIG. 6.

Figure 6:
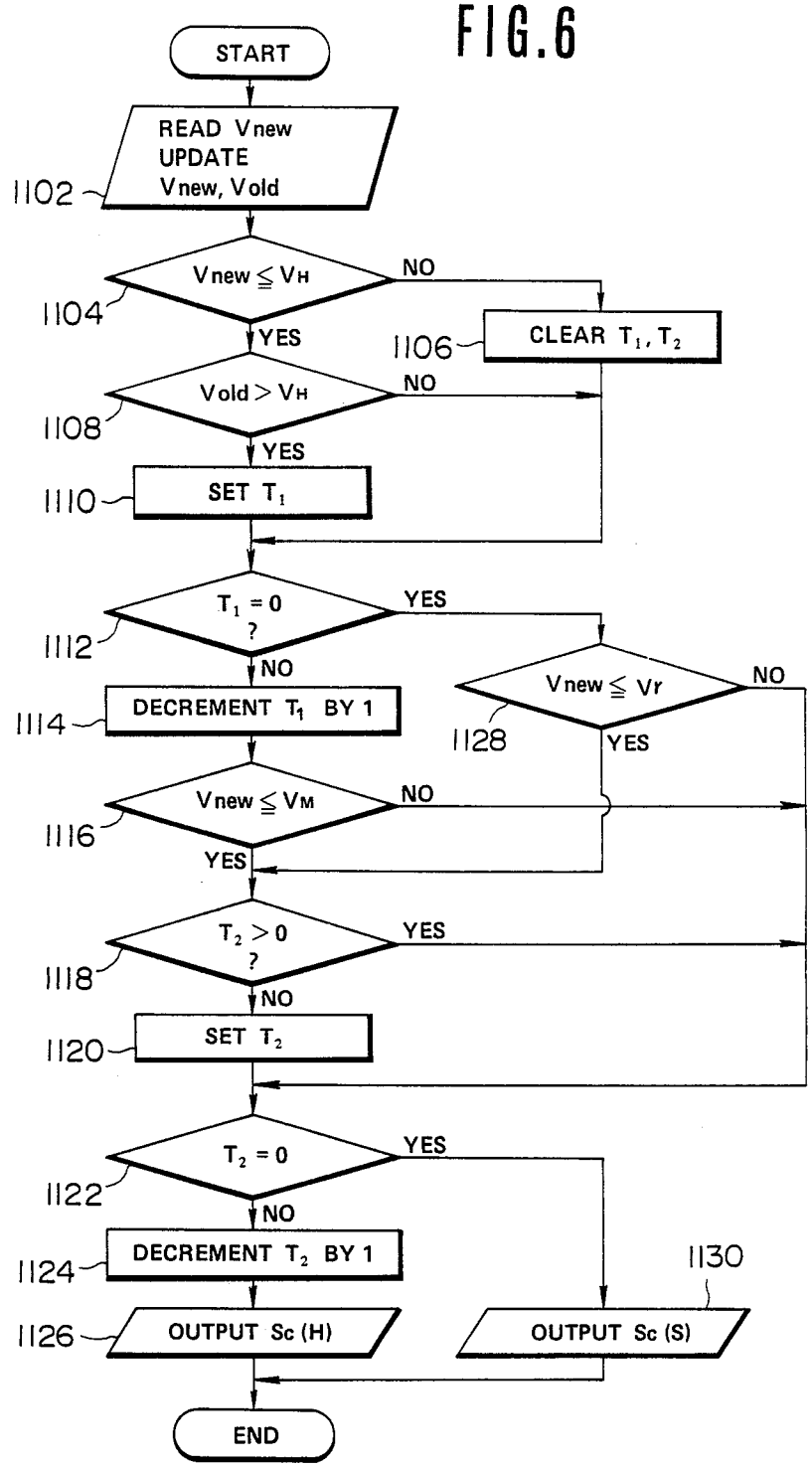
FIG. 6 is a flowchart of an anti-dive suspension control program to be executed in the control system of FIG. 2.
Figure 8:
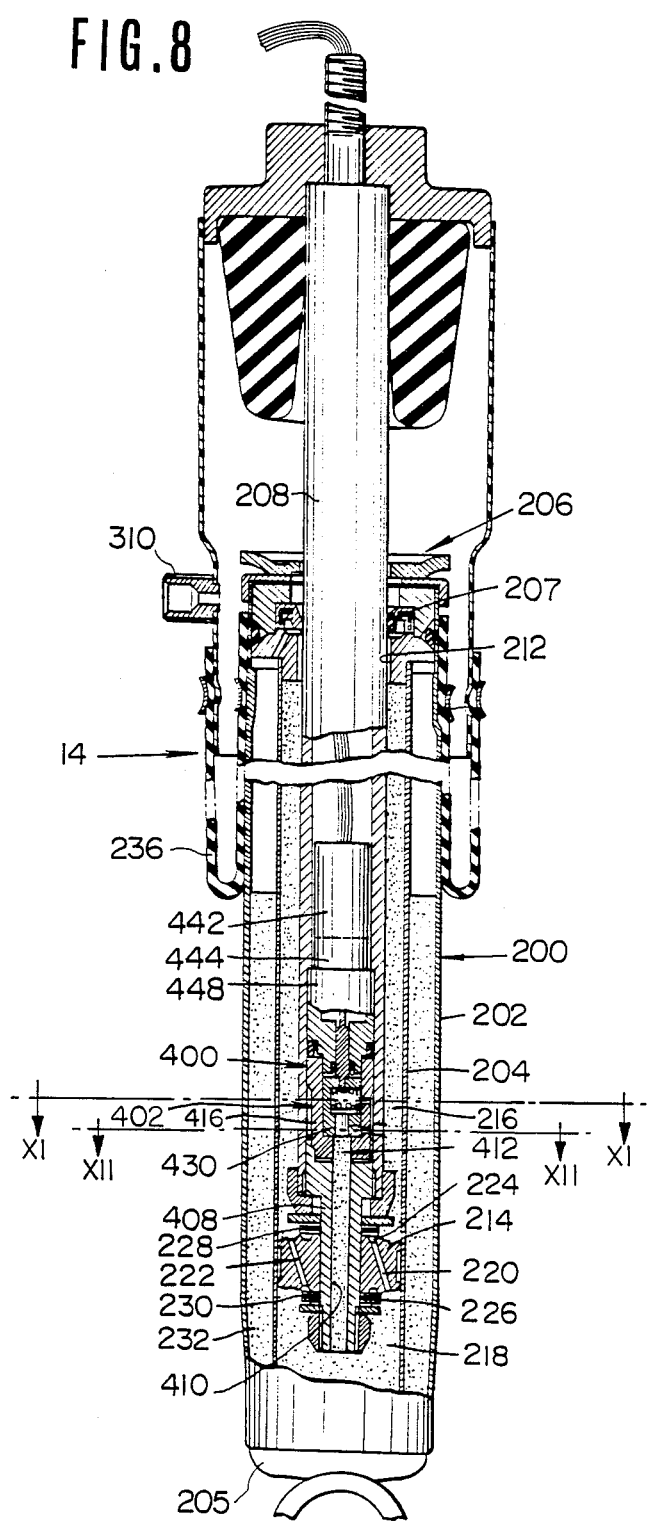
FIG. 8 is a longitudinal section of a modification of the shock absorber to be applied to the first embodiment of the invention.

FIG. 6 shows an anti-dive suspension control program to be executed by the controller 100. The shown program may be executed periodically with a given timing, i.e. every 20 msec.

Immediately after starting execution of the suspension control program, a value V of a vehicle speed counter 143, which is adapted to count the pulses converted from the alternating-current form to a vehicle speed indicative signal Sv by an analog-to-digital (A/D) converter 106 to derive an instantaneous vehicle speed V, is read out, at a step 1102. At the step 1102, at the same time, data in a memory block 145 which serves as fresh vehicle speed data storage $V_{new}$ is updated with the read out value which will be referred to hereafter as "fresh vehicle speed $V_{new}$". The data stored in the memory block 145 in the immediate preceding cycle of program execution is then transferred to another memory block 146 which serves as old vehicle speed data storage $V_{old}$. By the transferred value which will be referred to hereafter as "old vehicle speed $V_{old}$", the content of the memory block 146 is updated.

After the step 1102, the fresh vehicle speed $V_{new}$ is compared with a predetermined vehicle deceleration threshold $V_H$ at a step 1104. When the fresh vehicle speed $V_{new}$ is higher than the vehicle deceleration threshold, values $T_1$ and $T_2$ of timers 140 and 142 are reset at a step 1106. The timers 140 and 142 are adapted to count down clock pulses from a clock generator 148. On the other hand, when the fresh vehicle speed $V_{new}$ is equal to or lower than the vehicle deceleration threshold $V_H$, then the old vehicle speed $V_{old}$ is compared with the vehicle deceleration threshold $V_H$ at a step 1108. When the old vehicle speed $V_{old}$ is higher than the vehicle deceleration threshold $V_H$, then the timer 140 is set at a value $T_1$, at a step 1110.

When the old vehicle speed $V_{old}$ is equal to or smaller than the vehicle deceleration threshold $V_H$, or after one of the steps 1106 and 1110, process goes to a step 1112 in which the timer value $T_1$ is checked whether it is zero. Then, the timer value $T_1$ is decremented by 1 at a step 1114. When the timer value $T_1$ is greater than zero, then the fresh vehicle speed $V_{new}$ is compared with a predetermined abrupt deceleration threshold $V_M$, at a step 1116. When the fresh vehicle speed $V_{new}$ is equal to or lower than the abrupt deceleration threshold $V_M$ as checked at a step 1116, the timer 142 is checked whether the timer value $T_2$ is greater than zero at a step 1118. When the timer value $T_2$ as checked at the step 1118 is zero, then it is set at the value $T_2$ at a step 1120. Thereafter, the timer value $T_2$ is again checked whether the timer value $T_2$ is zero at a step 1122. When the timer value $T_2$ is greater than zero as checked at the step 1122, the timer value $T_2$ is decremented by 1 at a step 1124 and the control signal $S_c$ ordering HARD mode of the shock absorber 14 is output at a step 1126.

When the timer value $T_1$ as checked at a step 1112 is zero, the fresh vehicle speed $V_{new}$ is compared with a vehicle stopping threshold $V_L$ which is a smaller value than the abrupt deceleration threshold $V_M$, at step 1128. When the fresh vehicle speed $V_{new}$ is equal to or lower than the vehicle stopping threshold $V_L$, then process goes to the step 1118. On the other hand, when the fresh vehicle speed $V_{new}$ is higher than the vehicle stopping threshold $V_L$, process goes to the step 1122.

When the timer value $T_2$ as checked at the step 1122 is zero, the control signal $S_c$ ordering SOFT mode of the shock absorbers 14 is output at a step 1130.

As will be appreciated, in the foregoing process of anti-dive control, abrupt deceleration of the vehicle is recognized by the steps 1112, 1114, and 1116. For instance, the initial timer value $t_1$ is determined in relation to the vehicle speed drop from the vehicle deceleration threshold $V_H$ to the abrupt deceleration threshold $V_M$. Abrupt deceleration of the vehicle is thus recognized when the vehicle speed drops below the abrupt deceleration threshold $V_M$ within the period $t_1$ from the vehicle speed drops across the vehicle deceleration threshold.

Although the preferred process for detecting the vehicle deceleration has been disclosed hereabove with reference to FIG. 6, the vehicle deceleration higher than a given value may be detected in various ways. For example, the vehicle deceleration can be derived by differentiating the vehicle speed value V of the vehicle speed counter 143. By comparing the vehicle deceleration thus derived with a reference value indicative of the vehicle abrupt deceleration criteria, abrupt deceleration can be detected.

In the actual control, while the vehicle is running without decelerating the vehicle speed below the vehicle deceleration threshold $V_H$, the answer at the step 1104 is NO. Thus process goes to the step 1106 to clear the timer values $T_1$ and $T_2$ to zero. Then, process goes to the step 1112 to check whether the timer value $T_1$ is zero. Since the timer value $T_1$ is cleared at the step 1106, the answer at the step 1112 is YES. Therefore, process goes to the step 1128. Since the vehicle speed is higher than the vehicle stopping threshold $V_L$ as checked at the step 1128, the process goes to the step 1122. Since the timer value $T_2$ is also cleared at the step 1106, the answer at the step 1122 is YES. Therefore, the control signal $S_c$ ordering the SOFT mode is output at the step 1130.

Therefore, as long as the vehicle speed remains higher than the vehicle deceleration threshold $V_H$ the shock absorber 14 are maintained in SOFT mode.

When the vehicle is decelerated across the vehicle deceleration threshold $V_H$ and when the vehicle speed does not drop below the abrupt deceleration threshold $V_M$ within the given period defined by the timer value $T_1$, the shock absorber 14 is maintained in SOFT mode until the vehicle speed drops across the vehicle stopping threshold $V_L$.

Figure 7:
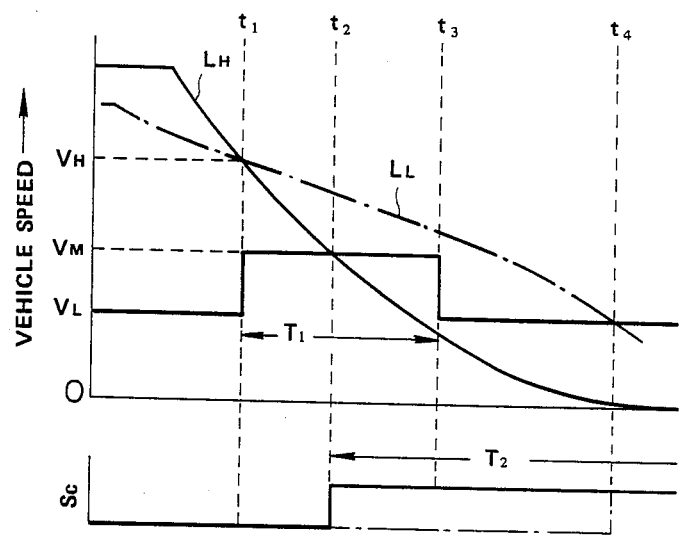
FIG. 7 is a explanatory timing chart of the operation of the control system of FIG. 2.

The foregoing operation to harden the suspension during moderate deceleration is illustrated in the timing chart in FIG. 7. As shown in dash-dot line $L_L$ of FIG. 7, after dropping the vehicle speed across the vehicle deceleration threshold $V_H$ at a time $t_1$, the vehicle speed does not decelerate across the abrupt deceleration threshold $V_M$ before a time $t_3$ when the period $T_1$ expires. Therefore, at time time $t_3$, the harder suspension criteria is switched from the abrupt deceleration threshold $V_M$ to the vehicle stopping threshold $V_L$. At a time $t_4$, the vehicle speed drops across the vehicle stopping threshold $V_L$. Therefore, the control signal $S_c$ ordering the HARD mode of the shock absorbers 14 is ouput at the time $t_4$. The control signal for HARD mode of the shock absorbers is maintained for the period defined by the initial timer value $T_2$.

When vehicle is decelerated abruptly to drop the vehicle speed across the abrupt deceleration threshold $V_M$ before the $T_1$ period expires, as shown by line $L_L$ of FIG. 7, at a time $t_2$, the harder suspension criteria is maintained at the level corresponding to the abrupt deceleration threshold $V_M$ as set at the time $t_1$. Therefore, when the vehicle speed drops across the abrupt deceleration threshold $V_M$ at the time $t_2$, the control signal orders the HARD mode of the shock absorber at the time $t_2$.

Though the first embodiment of the suspension control systems as set forth above employs a two-way variable damping characteristics shock absorber for varying the damping characteristics of the suspension between HARD mode and SOFT mode, it would be possible to employ shock absorbers which vary damping characteristics in more than two-ways. For example, a shock absorber which has three-way variable damping characteristics, i.e. HARD mode, MEDIUM mode and SOFT mode, is applicable for the foregoing first embodiment of the suspension control system. FIGS. 8 to 11 show the modification of the variable-damping-characteristic shock absorber of FIG. 9. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 204 and 202. Top and bottom ends of the cylinders 204 and 202 are plugged with fittings 206 and 205. The fitting 206 includes a seal 207 which establishes a liquid-tight seal. A piston rod 208 extends through an opening 212 formed in the fitting 206 and is rigidly connected to a vehicle body (not shown) at its top end. The piston rod 208 is, in turn, connected to a piston 214 reciprocally housed within the inner cylinder 204 and defining upper and lower fluid chambers 216 and 218 therein.

The piston 214 has fluid passages 220 and 222 connecting the upper and lower fluid chambers 216 and 218. The piston 214 also has annular grooves 224 and 226 along its upper and lower surfaces concentric about its axis. The uper end of the fluid passage 220 opens into the groove 224. On the other hand, the lower end of the fluid passage 222 opens into the groove 226. Upper and lower check valves 228 and 230 are provided opposite the grooves 224 and 226 respectively to close the grooves when in their closed positions. The lower end of the fluid passage 220 opens onto the lower surface of the piston at a point outside of the check valve 230. Likewise the upper end of the fluid passage 222 opens onto the upper surface of the piston at a point outside of the check valve 228.

Therefore, the fluid passage 222 is active during the piston expansion stroke, i.e. during rebound of the shock absorber. At this time, the check valve 228 prevents fluid flow through the fluid passage 220. On the other hand, during the piston compression stroke, i.e. during bounding movement of the suspension, the fluid passage 220 is active, allowing fluid flow from the lower fluid chamber 218 to the upper fluid chamber 216 and the fluid passage 222 is blocked by the check valve 230.

The piston rod 208 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 9:
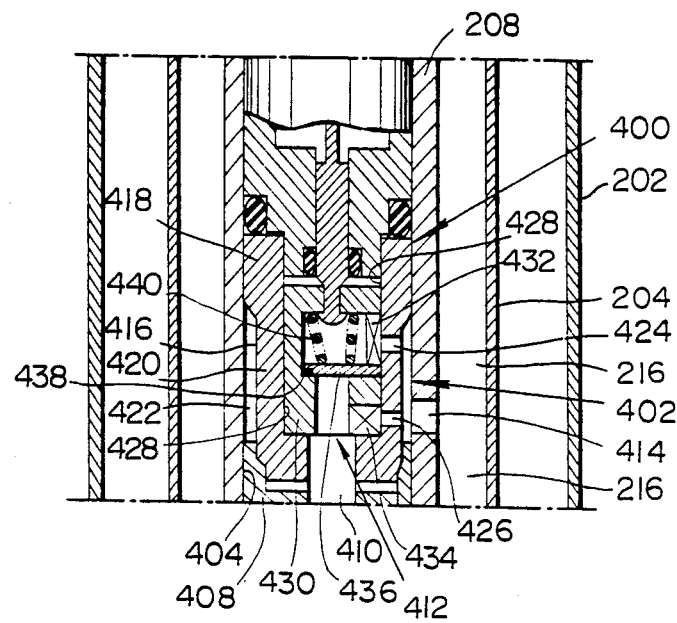
FIG. 9 is an enlarged section of the major part of the shock absorber of FIG. 8.

As shown in FIG. 9, the piston rod 208 defines an axially extending through opening 404 with the lower end opening into the lower fluid chamber 318. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 208 also has one or more radially extending orifices or openings 414 opening into the upper fluid chamber 316. Thus, the upper and lower fluid chambers 216 and 218 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

Figure 11A:
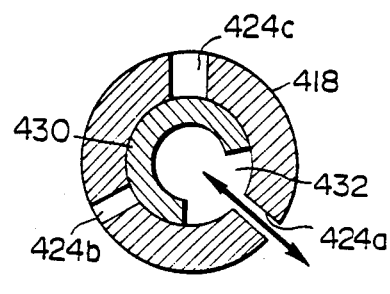
FIGS. 11A and 11B are cross sections taken respectively along lines XI—XI and XII—XII of FIG. 8.
Figure 11B:
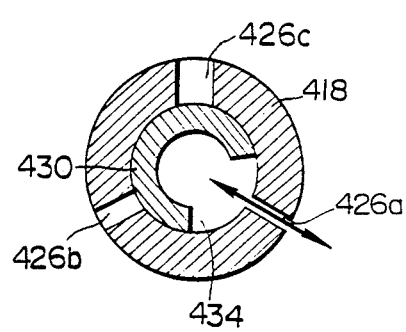
Figure 10:
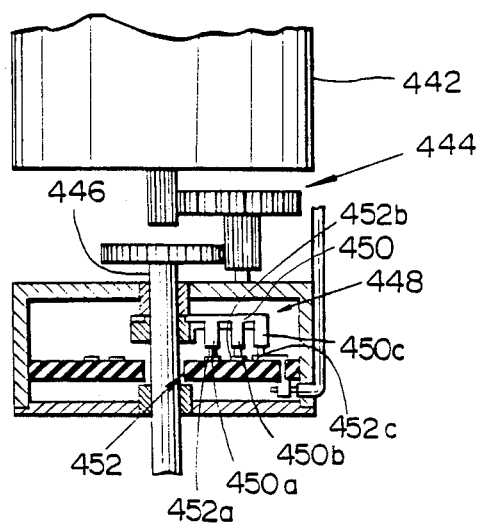
FIG. 10 is an enlarged section of a valve position sensor employed in the shock absorber of FIG. 8.

As shown in FIGS. 11(A) and 11(B), the orifices 424 and 426 respectively include first, second adn third orifices 424a, 424b, 424c, and 426a, 426b, and 426c. The first orifices 424a and 426b have the narrowest cross-sections and the orifices 432 and 434 are adapted to be in alignment with the first orifices to establish fluid communication between the upper and lower fluid chambers 216 and 218 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c and intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This causes the bound damping force to be somewhat weaker than the rebound damping force.

The rotary valve member 430 is associated with an electrically operable actuator such as an electrical step motor 442 through a differential gear unit 444 and an output shaft 446 as shown in FIG. 11. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to a controller 100 to receive the control signal as a mode selector signal which drives the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 8, the shock absorber has a fluid reservoir chamber 232 between its inner and outer cylinders 204 and 202, which fluid reservoir chamber 232 is in communication with the lower fluid chamber 218 via the bottom fitting 205 described previously. The bottom fitting 205 may serve to produce damping force in cooperation with the piston and the damping force adjusting mechanism during bounding and rebounding motion of the vehicle 236 is also defined between the inner and outer cylinders 204 and 202.

The operation of the damping force adjusting mechanism 400 will be briefly described herebelow with reference to FIGS. 11. FIGS. 11(A) and 11(B) show the case of the HARD mode. In this case, the orifice 432 of the rotary valve 430 is in alignment with the orifice 424a and the orifice 434 is in alignment with the orifice 426a. During vehicle rebounding motion, i.e., in the piston expansion stroke, the fluid flows from the upper fluid chamber 216 to the lower fluid chamber 218 through the orifice 426a. On the other hand, during vehicle bounding motion, the fluid flows from the lower fluid chamber 218 to the upper fluid chamber 216 through orifices 424a and 426a. Since the first orifices 424a and 426a are the narrowest, the damping force produced in this mode in the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 442 to operate the rotary valve member 430 to the corresponding valve position.

In the preferred anti-drive suspension control, HARD mode is used when hardening of suspension is ordered, SOFT mode and Medium mode are selectively used in a state referred to as SOFT mode in the foregoing first embodiment depending upon other control parameters.

Figure 12:
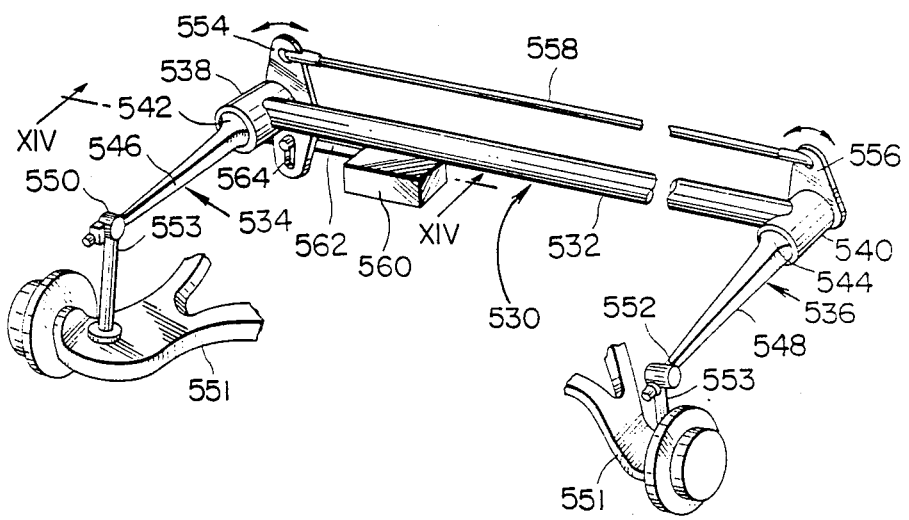
FIG. 12 is a perspective illustration of a stabilizer which constitutes the second embodiment of the suspension control system according to the invention.
Figure 13:
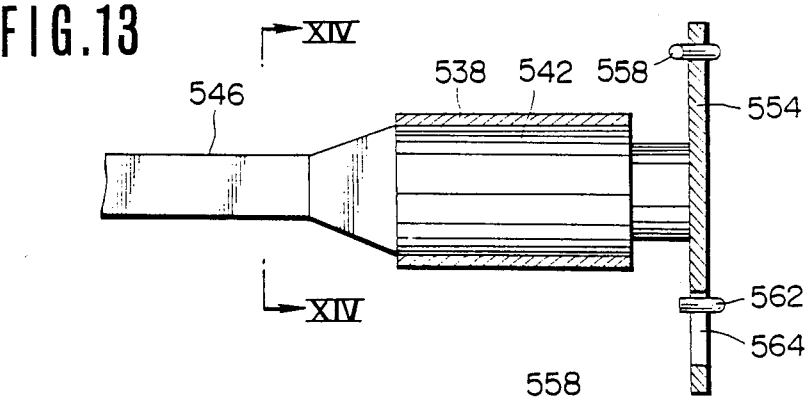
FIG. 13 is an enlarged section of a major part of the stabilizer of FIG. 12.
Figure 14:
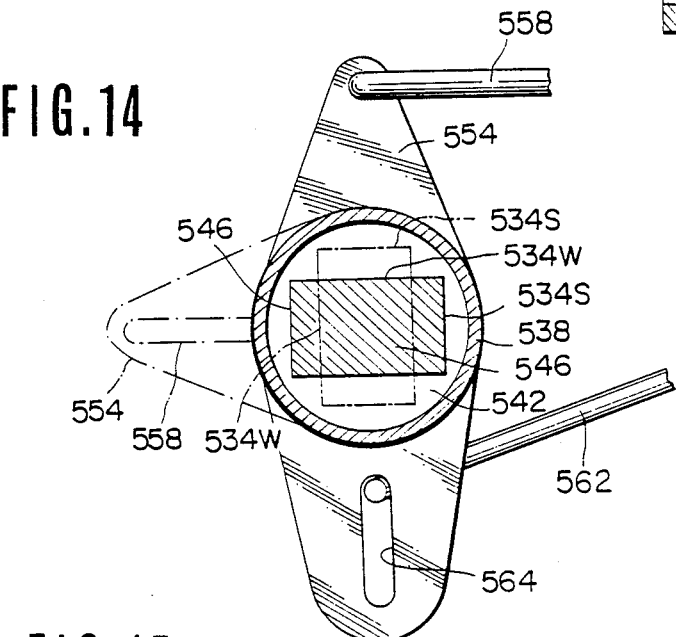
FIG. 14 is a cross-section taken along line XIV—XIV of FIG. 12.

FIGS. 12 to 14 show the structure of a roll stabilizer 530 to be controller by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearing portion 538 and 540. Link plates 554 and 556 are rigidly fitted onto the protruding ends of the parallel bar sections 534 and 536. The link plates 554 and 556 are rotatable about the bearing sections 538 and 540 together with the parallel bar sections 534 and 536. The link plates are connected to each other through a linkage 558. In addition, the link plate 554 is associated with an actuator 560 through an actuation rod 562 engaging an elongated opening 564 of the link plate 554. The actuator 560 may comprise an electromagnetically operative solenoid. The actuator is adapted to be energized by a control signal fed from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 536 through 90° within the bearing section 540.

As shown in FIG. 14, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the steering angle change matches or exceeds the threshold value, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

Figure 15:
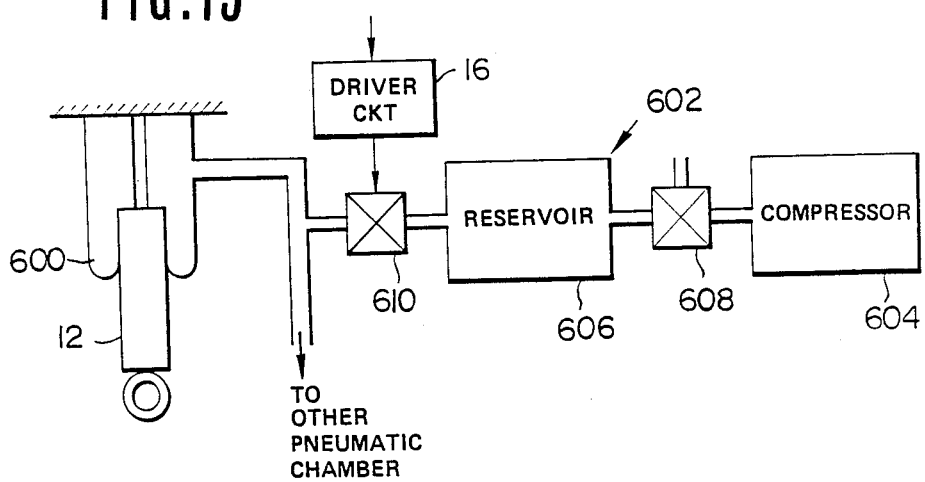
FIG. 15 is a schematic diagram of a vehicle height regulator system which controls vehicular height by controlling pneumatic pressure in a pneumatic chamber, which pneumatic pressure in the pneumatic chamber will serve as pneumatic spring for controlling damping characteristics of the suspension and thus constitutes the third embodiment of the suspension control system of the invention.

FIG. 15 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber.

Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the rough road which causes relatively low-frequency of vibration on the vehicle body as detected by the manner as set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 15 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European Patent Application No. 84100729.7, filed on Jan. 24, 1984. The contents of the above-identified U.S. Patents and the co-pending applications are hereby incorporated by reference.

Road surface condition dependent suspension control can also be achieved with this suspension system. When road roughness requires harder suspension, the pressure control valve 610 is closed to block fluid communication between the pneumatic chamber 600 and the reservoir in order to increase the stiffness of the strut assembly and so produce a greater damping force with which to suppress vibration of the vehicle body. On the other hand, on relatively smooth road surface conditions, the pressure control valve 610 remains open, allowing fluid communication between the pneumatic chamber and the reservoir chamber. As a result, sufficiently soft-shock-absorbing characteristics can be provided to ensure good riding comfort.

As set forth above, according to the present invention, the vehicular suspension system can provide both riding comfort and good drivability by controlling hardness of the suspension depending upon the road surface conditions.

It should be noted that although the shown embodiments control the damping force and/or rigidity of the suspension system by adjusting the damping characteristics of the suspension strut assemblies, it would also be possible to perform suspension control by adjusting the rigidity of a roll-stabilizer employed in the vehicle suspension. Such variable spring-force or damping-force stabilizers for vehicle suspension systems have been illustrated in the co-pending U.S. patent application Ser. No. 647,648, filed Sept. 6, 1984. The contents of the above-identified co-pending U.S. patent application are hereby incorporated by reference for the sake of disclosure.

What is claimed is:

1. A suspension control system for an automotive vehicle comprising:
   a vehicular suspension system having variable damping characteristics at least between a first harder suspension mode and a second softer suspension mode;

a vehicle speed sensor producing a vehicle speed signal representative of vehicle speed;

a controller for detecting vehicle speed drop across a predetermined value which is representative of a substantially low vehicle speed to produce a control signal for operating said suspension system into said first mode, said controller varying said predetermined value between a first greater value indicative of a deceleration threshold and a second smaller value indicative of a vehicle stopping threshold, said controller detecting vehicle deceleration amount to use said first greater value when said vehicle deceleration amount is greater than a given value and, otherwise to use said second value so as to operate said suspension into said first mode when said vehicle decelerates rapidly across said first greater value and to operate said suspension into said first mode when said vehicle is substantially at a standstill.

2. The suspension control system as set forth in claim 1, wherein said controller outputs said control signal ordering said first mode for said suspension for a given period of time.

3. The suspension control system as set forth in claim 1, wherein said suspension system comprises a hydraulic shock absorber which has variable damping characteristics at least between said first mode and said second mode.

4. The suspension control system as set forth in claim 3, wherein said hydraulic shock absorber comprises upper and lower fluid chambers filled with a working fluid and having variable respective volumes according to a piston stroke, said shock absorber being provided with a flow control valve having a valve position variable between a first mode position for restriction flow rate of working fluid in one of said upper and lower fluid chambers to the other through a flow path at a minimum rate, and a second mode position for allowing fluid flow through said flow path at a maximum rate.

5. The suspension control system as set forth in claim 1, wherein each of said suspension system comprises a stabilizer which is variable in stiffness at least between said first mode and said second mode.

6. The suspension control system as set forth in claim 1, wherein said suspension system comprises a pneumatic spring means providing pneumatical damping force for the corresponding suspension, which pneumatic spring means is variable in pneumatic pressure at least between said first mode and said second mode 7. A suspension control sytem for an automotive vehicle, comprising:

a suspension system having variable damping characteristics, at least between a first harder suspension mode and a second softer suspension mode;

a vehicle speed sensor producing a vehicle speed signal having a value representative of the vehicle speed;

a controller comparing said vehicle speed signal value with a predetermined threshold value which is representative of a substantially low vehicle speed to operate said suspension system into said first mode when the vehicle speed signal value varies across said threshold value, said controller detecting when the vehicle speed value decreases across a predetermined reference value which is greater than said threshold value, setting said threshold value at a first greater value and holding said threshold value at said first value for a given period and switching said threshold value to a second small value representative of a vehicle stopping threshold after said given period expires.

8. The suspension control system as set forth in claim 7, wherein said controller maintains said suspension system in said first mode for a given period of time.

9. The suspension control system as set forth in claim 8, wherein said controller is adapted to maintain said suspension system in said second mode while said vehicle speed signal value is held greater than said threshold value.

10. The suspension control system as set forth in claim 7, wherein said suspension system comprises a hydraulic shock absorber which has variable damping characteristics at least between said first mode and said second mode.

11. The suspension control system as set forth in claim 10, wherein said hydraulic shock absorber comprises upper and lower fluid chambers filled with a working fluid, said upper and lower chambers having variable respective volumes according to a piston stroke, said shock absorber being provided with a flow control valve having a valve position which is variable between a first mode position for restricting flow rate of working fluid in one of said upper and lower fluid chambers to the other through a flow path at a minimum rate, and a second mode position for allowing fluid flow through said flow path at a maximum rate.

12. The suspension control system as set for in claim 7, wherein said suspension system comprises a stabilizer which is variable in stiffness at least between said first mode and said second mode.

13. The suspension control system as set forth in claim 7, wherein said suspension system comprises a pneumatic spring means providing a pneumatical damping force for the corresponding suspension, which pneumatic spring means is variable in pneumatic pressure at least between said first mode and said second mode.

14. A method of dive controlling an automotive suspension system having variable damping characteristics at least between a first harder suspension mode and a second softer suspension mode, comprising the steps of:

monitoring vehicle speed;

deriving a vehicle deceleration amount on the basis of the vehicle speed variation;

setting a first higher threshold value to be compared with said vehicle speed when said vehicle deceleration amount is higher than a given value;

setting a second lower threshold value to be compared with said vehicle speed when said vehicle deceleration amount is lower than said given value, said second lower threshold value being representative of a vehicle stopping threshold;

comparing said vehicle speed with the set threshold value to operate said suspension system to said first mode when said vehicle speed is lower than said threshold value so as to operate said suspension into said first mode when said vehicle decelerates rapidly across said first higher threshold value and to operate said suspension into said first mode when said vehicle is substantially at a standstill.

15. The method as set forth in claim 14, wherein said second value is representative of substantially low vehicle speed.

16. The method as set forth in claim 15, which further comprises a step of switching the mode of said suspension system from said first mode to said second mode after a given period.

17. A method of controlling an automotive suspension system having variable damping characteristics at least between a first harder suspension mode and a second softer suspension mode, comprising:
   monitoring a vehicle speed to produce a vehicle speed signal having a value representative of the vehicle speed;
   detecting said vehicle speed indicative signal value decreasing across a first reference value to access a second reference value;
   comparing said vehicle speed indicative signal value with said second reference value to operate said suspension into said first mode when said vehicle speed indicative signal value decreases below said second reference value within a given period of time;
   detecting expiration of said given period of time and said vehicle speed indicative signal value being maintained higher than said second reference value to access a third reference value which is lower than said second reference value and is representative of a vehicle stopping threshold;
   comparing said vehicle speed indicative signal value with said third reference value to operate said suspension system into said first mode when said vehicle speed indicative signal value decreases across said third reference value such that the suspension system is operated into said first mode when said vehicle speed goes from said first reference value to said second reference value in said given period of time and is operated into said first mode when said vehicle is substantially at a standstill.

18. The method as set forth in claim 17, which further comprises the steps of measuring elapsed period after operating said suspension system into said first mode and operating said suspension system into said second mode when said elapsed period reaches a predetermined period.

19. A system for an automotive vehicle comprising:
   a suspension system having variable damping characteristics at least between a first harder suspension mode and a second softer suspension mode;
   a vehicle speed sensor for producing a vehicle speed signal having a value representative of the vehicle speed;
   a controller for comparing said vehicle speed signal value with a predetermined threshold value which is representative of a substantially low vehicle speed and which is variable depending upon a magnitude of vehicular deceleration derived based on said vehicle speed indicative signal value, and for controlling said suspension system to operate in said first mode when the vehicle speed decreases across said threshold value such that when said vehicle is decelerating rapidly, said suspension is operated into said first mode when said vehicle is at a relatively high speed and when said vehicle is decelerating slowly, said suspension is operated into said first mode when said vehicle speed decreases across a stopping threshold.

20. A method of controlling a automotive suspension system having variable damping characteristics at least between a first harder suspension mode and a second softer suspension mode, comprising:
   monitoring a vehicle speed to produce a vehicle speed signal having a value representative of the vehicle speed;
   comparing said vehicle speed indicative signal value with a predetermined reference value which is variable depending upon a magnitude of vehicular deceleration derived based on said vehicle speed indicative signal values such that the reference value is high when the deceleration is rapid and the reference value is a vehicle stopping reference when the deceleration is low;
   operating said suspension system in said first mode when said vehicle speed indicative signal value decreases across said reference value.

* * * * *